(12) United States Patent
Chen

(10) Patent No.: US 12,044,803 B1
(45) Date of Patent: Jul. 23, 2024

(54) HYBRID SOLID-STATE LIDAR AND SCANNING METHOD THEREOF

(71) Applicant: PHOTONAI TECHNOLOGY INC, Irvine, CA (US)

(72) Inventor: Zexiong Chen, Irvine, CA (US)

(73) Assignee: PHOTONAI TECHNOLOGY INC, Irvine, CA (US)

( * ) Notice: Subject to any disclaimer, the term of this patent is extended or adjusted under 35 U.S.C. 154(b) by 0 days.

(21) Appl. No.: 18/530,259

(22) Filed: Dec. 6, 2023

(51) Int. Cl.
*G01S 7/481* (2006.01)

(52) U.S. Cl.
CPC .......... *G01S 7/4817* (2013.01); *G01S 7/4815* (2013.01); *G01S 7/4816* (2013.01)

(58) Field of Classification Search
CPC .................................................. G01S 7/4817
See application file for complete search history.

(56) References Cited

U.S. PATENT DOCUMENTS

| 5,835,252 A * | 11/1998 | Meier | G09B 27/02 |
| | | | 359/201.1 |
| 2021/0215825 A1 * | 7/2021 | Huang | G01S 7/4865 |
| 2023/0272893 A1 * | 8/2023 | Li | F21S 41/176 |
| | | | 362/459 |

* cited by examiner

*Primary Examiner* — Yuqing Xiao
*Assistant Examiner* — Clara G Chilton

(57) ABSTRACT

A hybrid solid-state lidar and a scanning method thereof. The hybrid solid-state lidar includes a rotating polygon mirror, reflecting mirrors, a wedge prism, and laser emitting and receiving systems. The laser emitting and receiving systems have projections distributed on a same circumference on a horizontal plane and are arranged under the wedge prism in a way that the circumference is circumferentially equally divided by the projections, to allow the wedge prism to refract detection laser emitted by the laser emitting and receiving systems to form one-dimensional scanning light; and the reflecting mirror is disposed above the wedge prism at a position corresponding to the laser emitting and receiving system, and the rotating polygon mirror is disposed at a center axis position above the wedge prism, whereby the reflecting mirror reflects the one-dimensional scanning light to the rotating polygon mirror which reflects the one-dimensional scanning light to form two-dimensional scanning light.

10 Claims, 15 Drawing Sheets

HYBRID SOLID-STATE LIDAR AND SCANNING METHOD THEREOF

TECHNICAL FIELD

The present disclosure relates to the field of lidar technologies, and in particular, to a hybrid solid-state lidar and a scanning method thereof.

BACKGROUND

Currently, a 360° lidar is mostly a mechanical lidar. The mechanical lidar performs horizontal scanning by rotating a lens, a camera, and a mechanical structure in a laser emitting and receiving system around an axis, and performs vertical scanning through stacking of components. In this way, the mechanical lidar finally achieves two-dimensional scanning. The common mechanical lidar has the following problems. Its long-term rotation may cause optical system failure, circuit system damage, mechanical system wear, and the like, which makes it difficult to ensure the stability and service life of the mechanical lidar. In addition, the number of groups of emitting components stacked in the vertical direction determines the number of scanning lines and a resolution. Therefore, N groups of different emitting and receiving units in the vertical direction are required to implement N-line scanning, and the final resolution is thus affected by the units.

In addition, when performing N-line scanning, the conventional mechanical lidar needs to adjust the N groups of laser emitting and receiving units one by one. In this case, there is huge difficulty in adjustment and a long cycle, and the units cannot be adjusted again once fixed. The repeated use of a large number of laser emitting and receiving units increases the unit cost, the difficulty of circuit design also increases, and a performance requirement of a main processing chip also increases, making it hard to decrease the entire cost of the mechanical lidar. When a mechanical lidar is used in an electric vehicle, the power of the mechanical lidar is excessively high because of the stacking lasers, which is not good for the mechanical lidar to have wide application in the electric vehicle. In addition, a laser emitter, as a high-temperature heat source, is usually disposed close to a temperature-sensitive optical receiving system. Therefore, the heat can hardly be dissipated, resulting in a high temperature inside the mechanical lidar and a negative impact on the optical receiving system, and ultimately damaging the performance of the whole mechanical lidar.

SUMMARY

To resolve the foregoing technical problems, the present disclosure provides a hybrid solid-state lidar and a scanning method thereof, to avoid stability and service life risks caused by rotation of a component and problems of excessively high power consumption and excessively large heat of the mechanical lidar generated by stacked lasers. According to the present disclosure, fewer laser emitting and receiving elements are used to implement two-dimensional scanning with higher performance than the conventional lidar According to a first aspect, the present disclosure provides a hybrid solid-state lidar, where the lidar includes:
a rotating polygon mirror, a plurality of reflecting mirrors, a wedge prism, and a plurality of laser emitting and receiving systems, where the plurality of laser emitting and receiving systems have projections distributed on a same circumference on a horizontal plane and are arranged under the wedge prism in a way that the circumference is circumferentially equally divided by the projections, to allow the wedge prism to refract detection laser emitted by each of the plurality of laser emitting and receiving systems to form one-dimensional scanning light; and each of the plurality of reflecting mirrors is disposed above the wedge prism and at a position corresponding to one of the plurality of laser emitting and receiving systems, and the rotating polygon mirror is disposed at a central axis position above the wedge prism, whereby each of the plurality of reflecting mirrors reflects the one-dimensional scanning light to form one-dimensional scanning light in a vertical direction and make the one-dimensional scanning light in the vertical direction incident on the rotating polygon mirror, and the rotating polygon mirror reflects the one-dimensional scanning light in the vertical direction, to form two-dimensional scanning light.

Further, the rotating polygon mirror and the wedge prism rotate in a same direction at a preset speed ratio.

Further, reflecting surfaces of the rotating polygon mirror are arranged in a manner of equally dividing a circumscribed circle of a cross section of the rotating polygon mirror.

Further, each of the plurality of laser emitting and receiving systems emits the detection laser upward along a vertical plane.

Further, each of the plurality of laser emitting and receiving systems includes a plurality of groups of laser emitting units and laser receiving units.

Further, each of the laser emitting units includes a semiconductor laser, and each of the laser receiving units includes an avalanche photo diode (APD) and/or a silicon photo multiplier (SIPM) array sensor.

Further, a plurality of the wedge prisms are provided, and the plurality of the wedge prisms are arranged according to a preset rule to form a wedge prism group.

According to a second aspect, the present disclosure provides a hybrid solid-state lidar scanning method, where the method includes:
emitting, by each of a plurality of laser emitting and receiving systems, detection laser;
refracting the detection laser by a wedge prism, to form one-dimensional scanning light; and
reflecting the one-dimensional scanning light by a reflecting mirror, to form one-dimensional scanning light in a vertical direction and make the one-dimensional scanning light in the vertical direction incident on a rotating polygon mirror, and reflecting the one-dimensional scanning light in the vertical direction by the rotating polygon mirror, to form two-dimensional scanning light.

Further, the step of refracting the detection laser by a wedge prism, to form one-dimensional scanning light includes:
rotating the wedge prism at a preset speed in a preset direction, whereby the detection laser is refracted through the wedge prism to form annular scanning light.

Further, the step of reflecting the one-dimensional scanning light in the vertical direction by the rotating polygon mirror, to form two-dimensional scanning light includes:
reflecting the one-dimensional scanning light in the vertical direction emitted by each of the plurality of laser emitting and receiving systems by the rotating polygon mirror to form a plurality of scanning regions having preset horizontal angles; and splicing the scanning regions to form two-dimensional scanning with a 360° scanning region.

The present disclosure provides the hybrid solid-state lidar and the scanning method thereof. In the present disclosure, the plurality of laser emitting and receiving systems and all the circuit systems are fixed, stability and service life risks caused by rotation of components in the lidar can be effectively avoided, and two-dimensional scanning with higher performance than the conventional lidar can be implemented by using a reduced number of laser emitting and receiving systems. In addition, a reduced number of components can effectively reduce the power consumption and the heat generated by the lidar, thereby improving the stability of lidar.

DETAILED DESCRIPTION

In order to make the objectives, technical solutions, and advantages of the embodiments of the present disclosure clearer, the technical solutions in the embodiments of the present disclosure will be clearly and completely described below in conjunction with the accompanying drawings in the embodiments of the present disclosure. Apparently, the described embodiments are some, rather than all of the embodiments of the present disclosure. All other embodiments obtained by those skilled in the art based on the embodiments of the present disclosure without creative efforts shall fall within the protection scope of the present disclosure.

Figure 1:
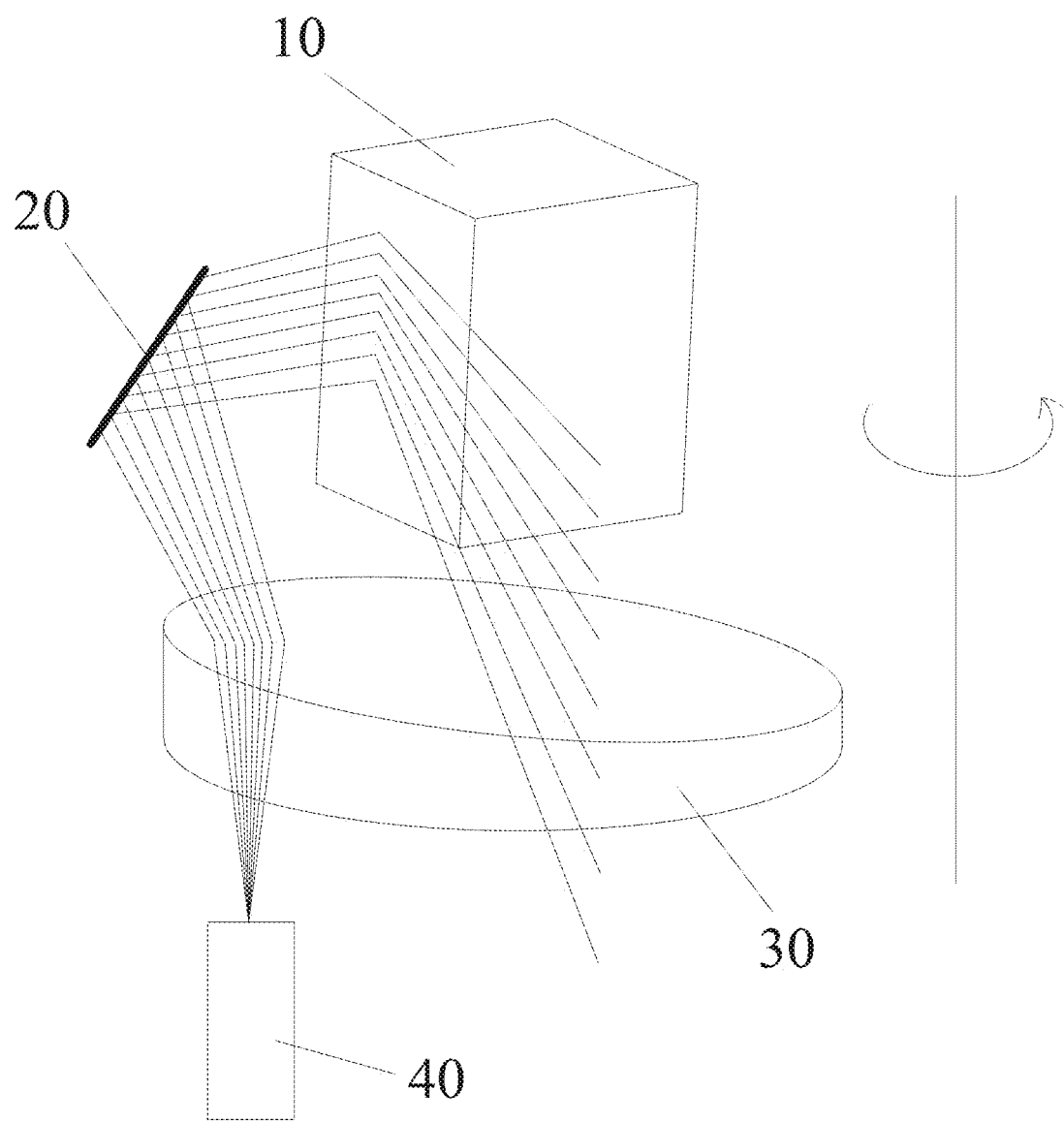
FIG. 1 is a schematic structural diagram of a hybrid solid-state lidar according to an embodiment of the present disclosure.

Referring to FIG. 1, a first embodiment of the present disclosure provides a hybrid solid-state lidar, including: a rotating polygon mirror 10, a plurality of reflecting mirrors 20, a wedge prism 30, and a plurality of laser emitting and receiving systems 40.

In this embodiment, the lidar has components arranged in three layers.

A first layer is the plurality of laser emitting and receiving systems 40. The plurality of laser emitting and receiving systems 40 have projections distributed on a same circumference on a horizontal plane and are arranged under the wedge prism 30 in a way that the circumference is circumferentially equally divided by the projections. For example, there are three laser emitting and receiving systems 40, and the three laser emitting and receiving systems 40 are evenly distributed below the wedge prism 30 at an angle of 120° between every two laser emitting and receiving systems. The angle refers to an angle generated by a projection of each laser emitting and receiving system 40 in the horizontal direction with a center point of the wedge prism 30 as a center. It should be noted that only one laser emitting and receiving system 40 is shown in FIG. 1.

Each of the plurality of laser emitting and receiving systems 40 includes a plurality of groups of laser emitting units and laser receiving units. Herein N represents a number of groups formed by the laser emitting units and the laser receiving units, and N≥1. Each of the laser emitting units is configured to emit laser for detection, that is, a plurality of laser emitting units emit detection laser upward along a vertical plane. The detection laser forms different angles with an x-axis in a rectangular coordinate system in the vertical plane. A laser emitter is a semiconductor laser or another type of laser emitting element.

Each of the laser receiving units is configured to receive laser returned after detection. Each of the laser receiving units includes a detector, and the detector may be an optical detection element such as an avalanche photo diode (APD) and/or a silicon photo multiplier (SIPM) sensor. It should be noted that the laser emitting and receiving system 40 is further provided with a collimation unit and a focus unit to collimate and focus the detection laser. Details are not described herein again.

A second layer is the wedge prism 30. The wedge prism 30 is located above the laser emitting and receiving system 40 and rotates at a preset speed in a preset direction. A third layer is an uppermost layer of the lidar and includes the rotating polygon mirror 10 and the plurality of reflecting mirrors 20. A number of the plurality of reflecting mirrors 20 is consistent with a number of the plurality of laser emitting and receiving systems 40, the plurality of reflecting mirrors 20 are disposed above the wedge prism 30, and each reflecting mirror 20 is in a one-to-one correspondence with the each laser emitting and receiving system 40 in position. For example, when there are three laser emitting and receiving systems 40, there are correspondingly three reflecting mirrors 20. The reflecting mirrors 20 have projections distributed on a same circumference on a horizontal plane and are fixedly disposed above the wedge prism 30 in a way that the circumference is circumferentially equally divided by the projections. The rotating polygon mirror 10 is disposed at a center axis position above the wedge prism 30, that is, the reflecting mirrors 20 are disposed around the rotating polygon mirror 10. The rotating polygon mirror 10 is a polyhedron in which reflecting surfaces 101 are arranged in a manner of equally dividing a circumscribed circle of a cross section of the rotating polygon mirror 10. In this embodiment, the rotating polygon mirror 10 of a hexahedron prism structure with four reflecting surfaces is used as an example, that is, the reflecting surfaces 101 of the rotating polygon mirror 10 are all perpendicular to a horizontal plane, and certainly, a polyhedron with another number of surfaces may alternatively be used. Details are not described herein again.

In the lidar provided in this embodiment, the detection laser emitted by the laser emitting unit upward along the vertical plane shifts by a specific angle through refraction of the wedge prism 30. When the wedge prism 30 rotates at the preset speed, the shift of the laser changes, and the wedge prism 30 rotates a circle to form an annular trajectory. Therefore, a shift trajectory of the laser may be controlled by setting an angle of a wedge surface of the wedge prism 30 and a rotation angle of the wedge prism 30.

Figure 2A:
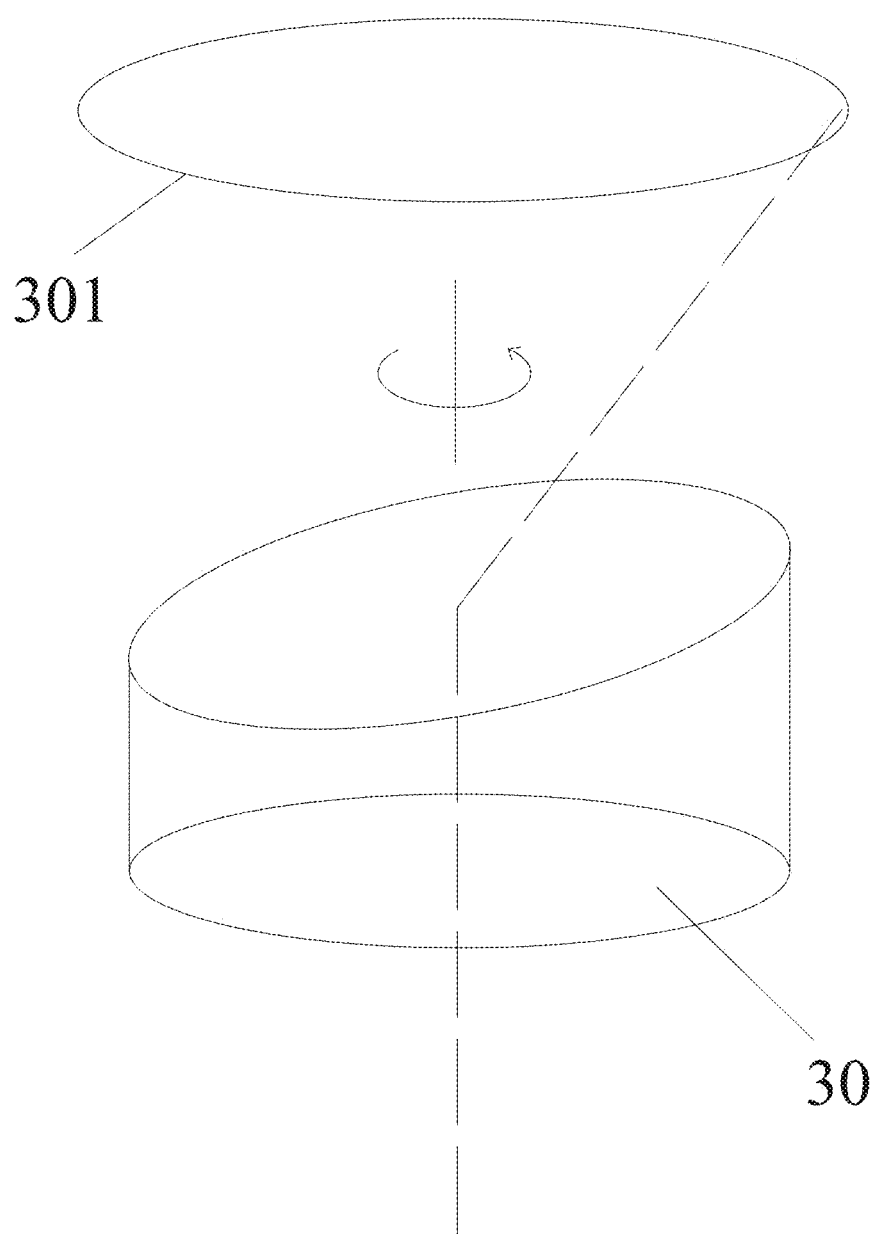
FIG. 2A and FIG. 2B are schematic diagrams of optical paths in which the lidar in FIG. 1 generates annular scanning light.
Figure 2B:
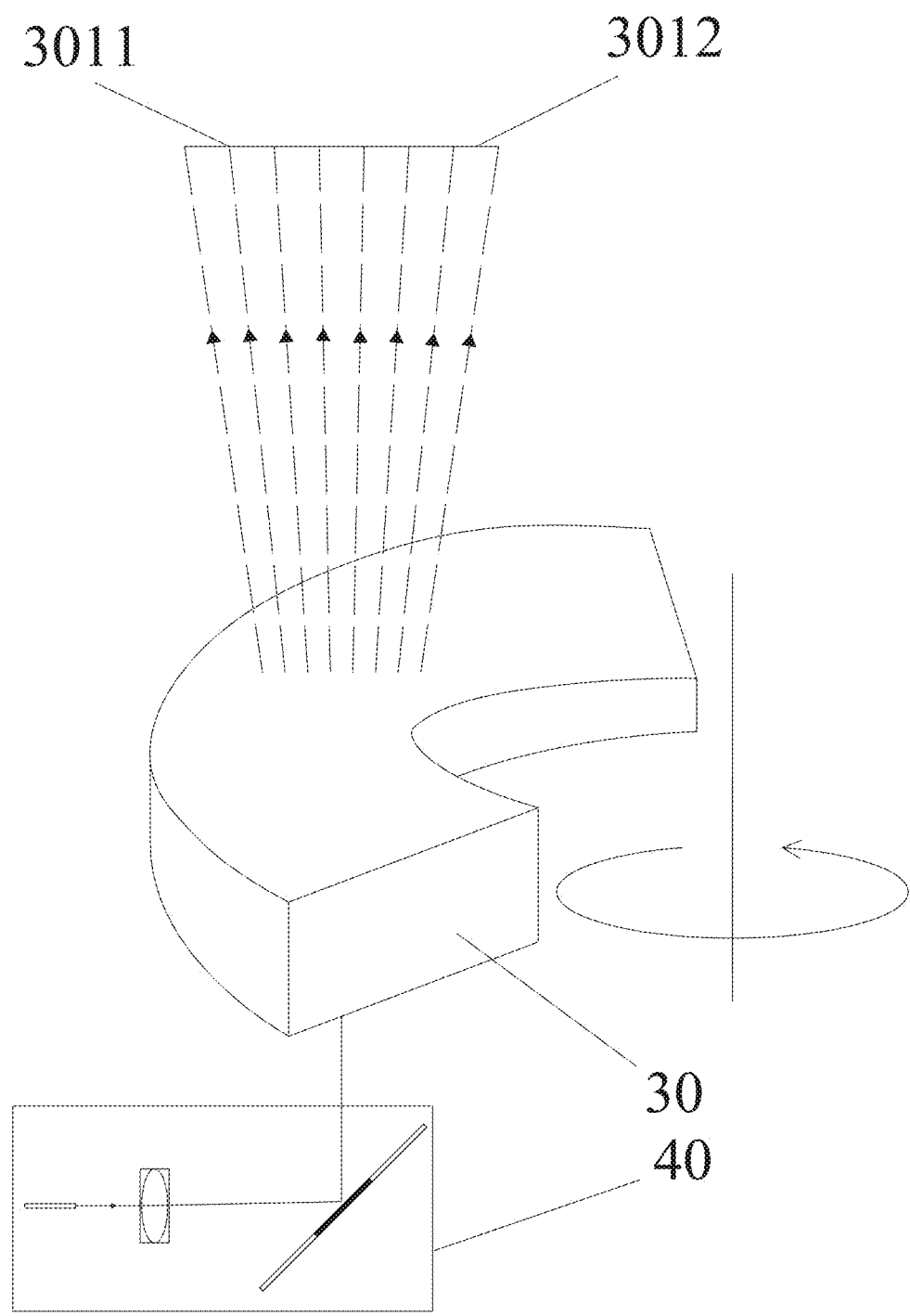

Specifically, referring to FIG. 2A, when a single laser is emitted from bottom to top and passes through the wedge prism 30, the laser is deflected toward a relatively thick side of the wedge prism. When the wedge prism 30 rotates, the refracted laser performs periodical annular scanning. For example, when the wedge prism 30 rotates counterclockwise at a preset speed of one circle/min, annular scanning light 301 is formed. As shown in FIG. 2B, if a trajectory formed by rotating the wedge prism 30 by a° is obtained, for example, a° is 120°, it can be seen that scanning points 3011 are connected to form several segments of small arcs. The arcs are combined to form one-dimensional scanning light 3012 that approximates a straight line. Only a partial structure of the wedge prism 30 in FIG. 2B is shown as an example.

Figure 3:
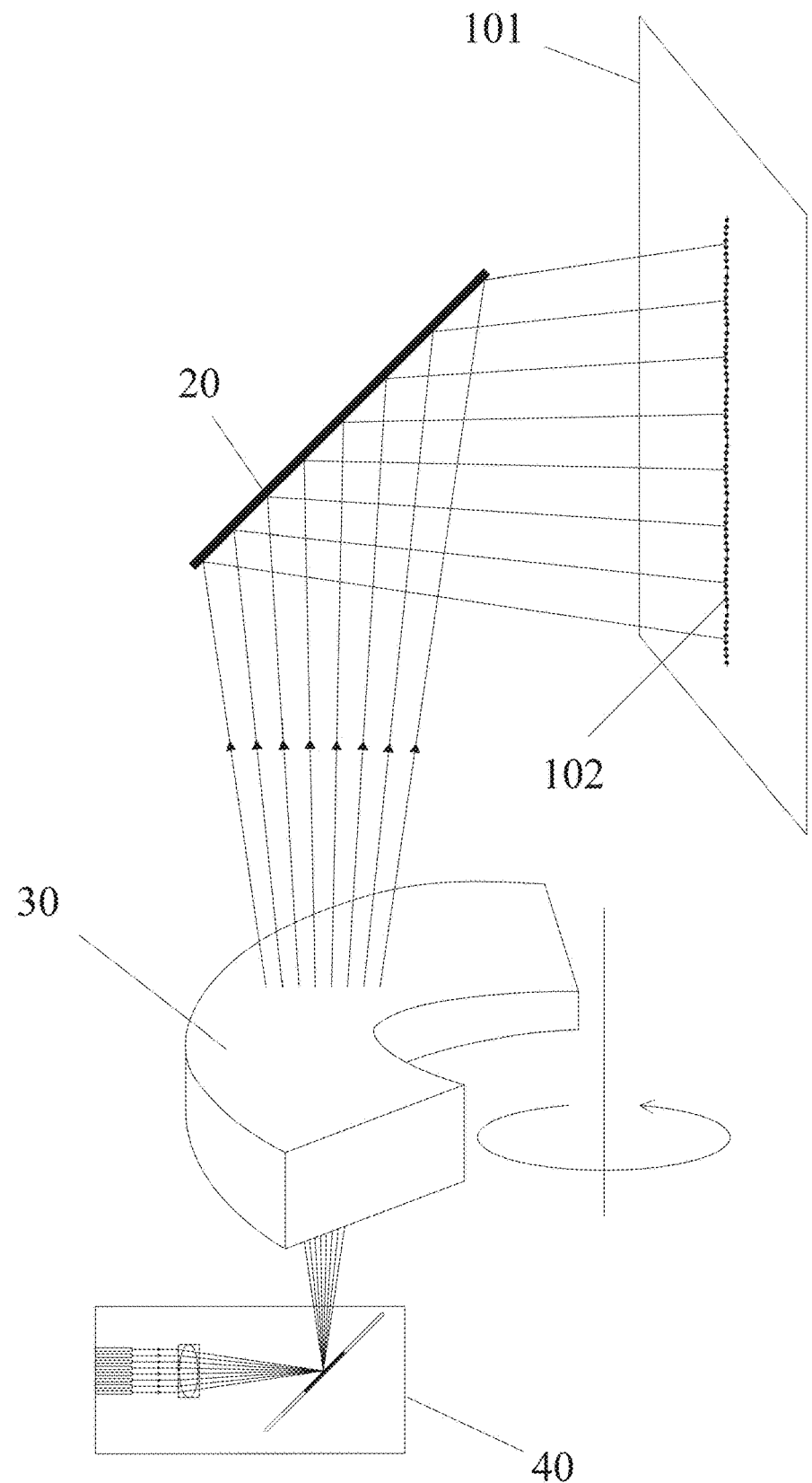
FIG. 3 is a schematic diagram of an optical path in which the lidar in FIG. 1 generates one-dimensional scanning light in a vertical direction.

Referring to FIG. 3, because one reflecting mirror 20 is disposed at a position corresponding to one laser emitting and receiving system 40, the detection laser refracted by the wedge prism 30 is reflected by the reflecting mirror 20 above the wedge prism. When the reflecting mirror 20 reflects the one-dimensional scanning light 3012 to the reflecting surface 101 of the rotating polygon mirror 10, one-dimensional scanning light 102 in a vertical direction is formed, and a vertical field of view formed by the one-dimensional scanning light 102 in the vertical direction is a scanning angle formed by the one-dimensional scanning light 3012 in the vertical direction.

Figure 4:
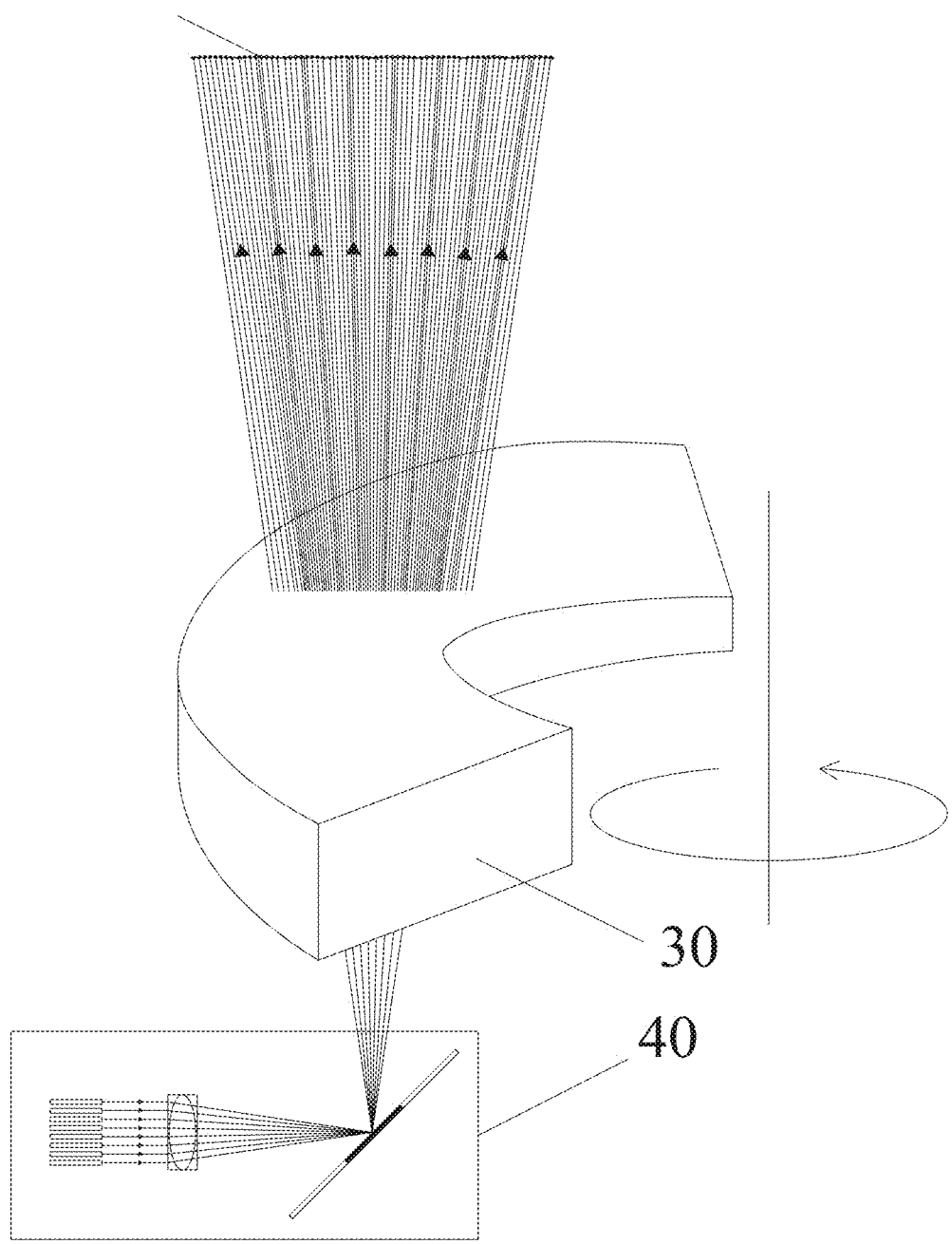
FIG. 4 is a schematic diagram of an optical path of one-dimensional scanning light formed by a plurality of detection laser.

When a light source is an array of N emitting lasers, as shown in FIG. 4, it is assumed that the laser emitting unit emits eight detection laser. A plurality of detection laser is emitted at different angles, an angle of a light beam incident on the wedge prism 30 is necessarily greater than an angle of a light beam of single detection laser, and an angle of a light beam is increased by deflecting the detection laser through the wedge prism 30. Therefore, a scanning angle and scanning density of one-dimensional scanning light 3012 formed by the plurality of detection laser are necessarily greater than a scanning angle and scanning density of the one-dimensional scanning light 3012 formed by the single detection laser. That is, a vertical field of view and scanning density of the lidar can be increased by increasing a number of laser emitting units.

The rotating polygon mirror 10 is set to rotate in a same direction as the wedge prism 30, and a rotation speed of the rotating polygon mirror 10 and the rotation speed of the wedge prism 30 forms a preset speed ratio. It is assumed that both the rotating polygon mirror 10 and the wedge prism 30 rotate counterclockwise. When the rotation speed of the wedge prism 30 is one circle/min, if the preset speed ratio is 6, the rotation speed of the rotating polygon mirror 10 is six circles/min, and if the preset speed ratio is 12, the rotation speed of the rotating polygon mirror 10 is 12 circles/min. It should be noted that the rotation speeds of the rotating polygon mirror 10 and the wedge prism 30 can be flexibly set according to an actual application scenario of the lidar, which are only described as an example and not specifically limited herein.

Figure 5:
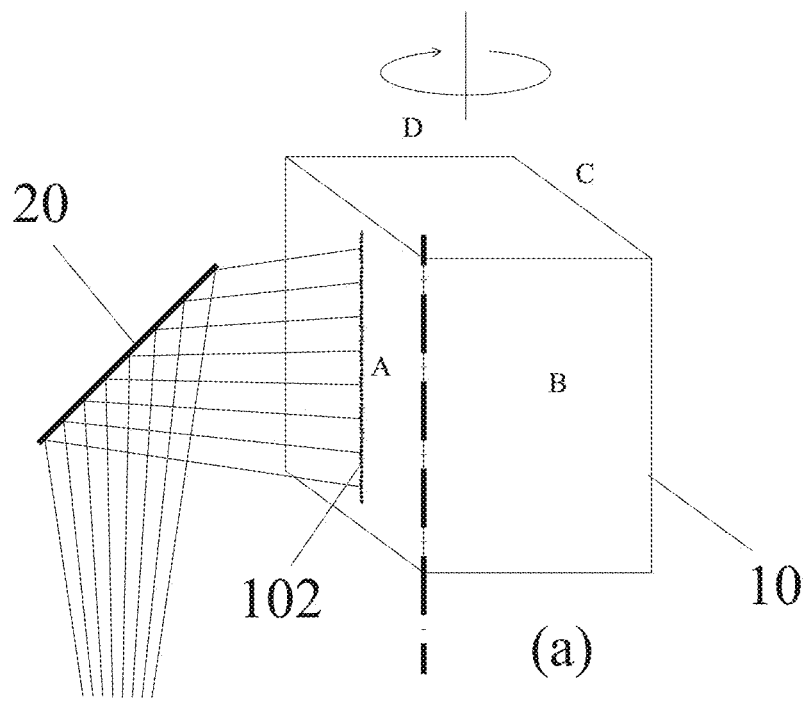
FIG. 5 is a schematic diagram of a trajectory formed by reflecting one-dimensional scanning light to a reflecting surface of a rotating polygon mirror.
Figure 5:
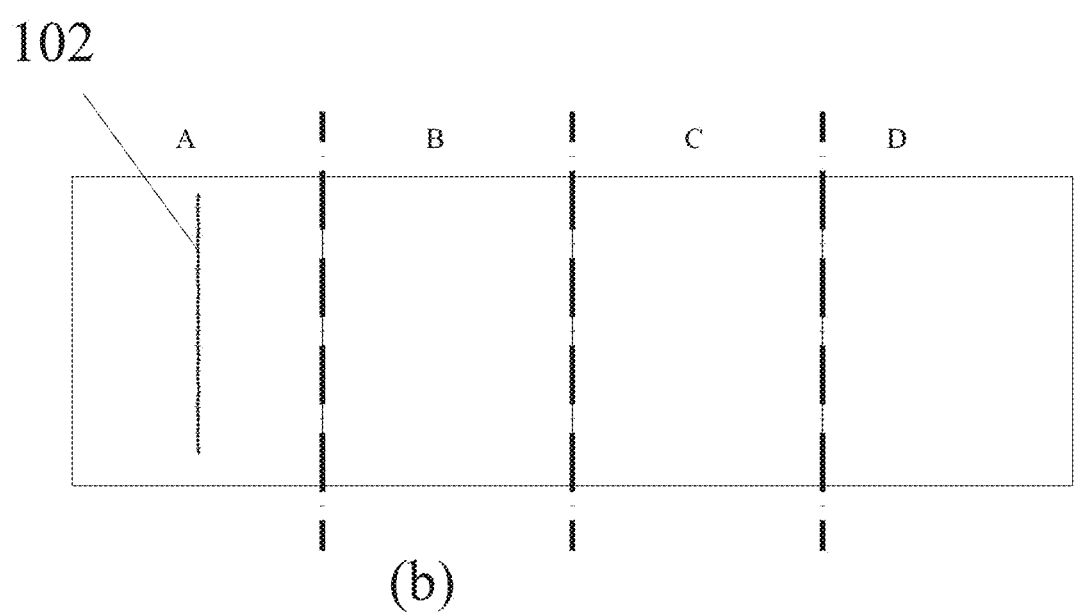
Figure 6A:
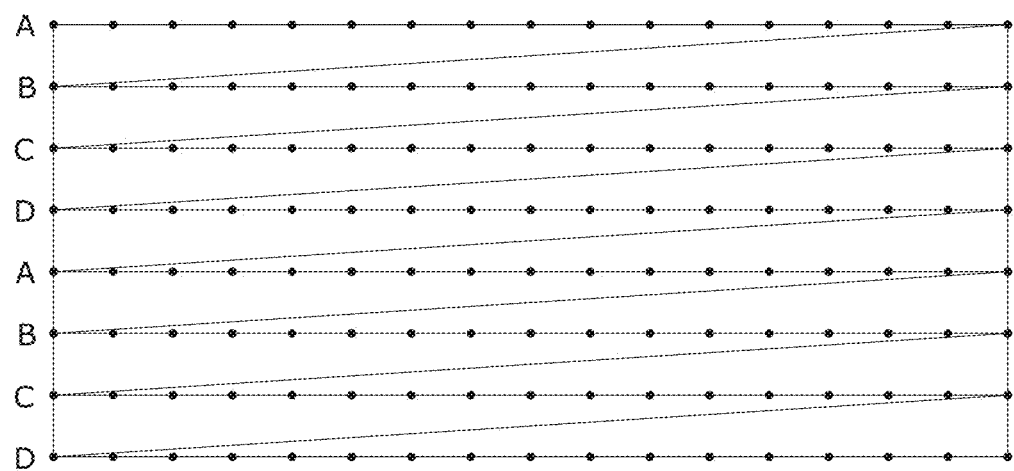
FIG. 6A and FIG. 6B are schematic diagrams of a trajectory formed by reflecting one-dimensional scanning light in a vertical direction through a rotating polygon mirror.
Figure 6B:
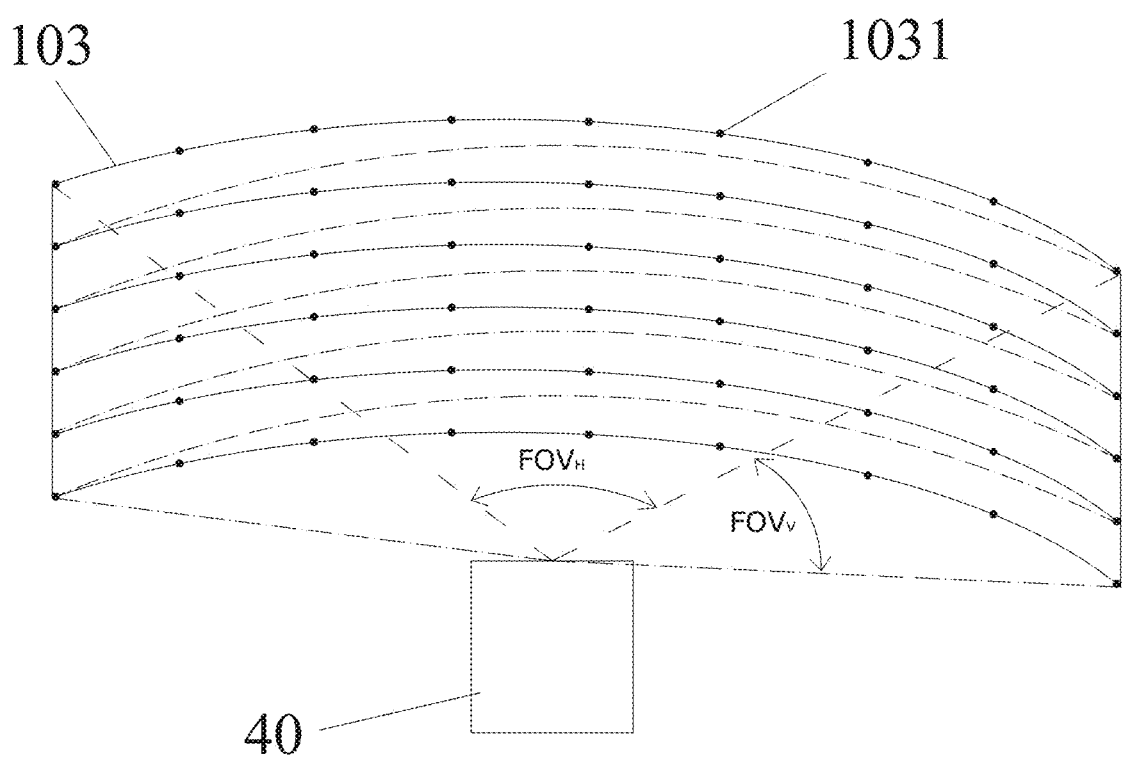

For example, the rotation speed of the wedge prism 30 is one circle/min, and the preset speed ratio is 6. In this case, the rotating polygon mirror 10 rotates at the rotation speed of six circles/min, and the one-dimensional scanning light 102 in the vertical direction reflected to the reflecting surface 101 is reflected again. Referring to a part (a) in FIG. 5, four reflecting surfaces 101 of the rotating polygon mirror 10 are respectively set to a surface A, a surface B, a surface C, and a surface D. When the one-dimensional scanning light 3012 is reflected to the surface A of the rotating polygon mirror 10, the one-dimensional scanning light 102 in the vertical direction is formed. A part (b) in FIG. 5 is a schematic diagram after four reflecting surfaces 101 of the rotating polygon mirror 10 are unfolded. Horizontal scanning is performed on the one-dimensional scanning light 102 in the vertical direction with the rotation of the rotating polygon mirror 10. Because the preset speed ratio is 6, when the wedge prism rotates by 120°, the rotating polygon mirror 10 rotates by 120° *6=720°, that is, the rotating polygon mirror 10 rotates two circles. In this case, a formed horizontal scanning trajectory is shown in FIG. 6A, that is, horizontal scanning is performed on the one-dimensional scanning light 102 in the vertical direction with the rotation of the rotating polygon mirror 10. After cloud trajectories of scanning points on the four surfaces are spliced, a two-dimensional point cloud in horizontal and vertical directions is finally formed. As shown in FIG. 6B, a single laser emitting unit is used as an example, scanning points 1031 form a scanning trajectory of a field of view point cloud of the lidar in the horizontal and vertical directions, that is, two-dimensional scanning light 103. A field of view range that can be detected by the lidar may be obtained from the two-dimensional scanning light 103 and includes a horizontal field of view FOVH and a vertical field of view $FOV_V$.

Figure 7:
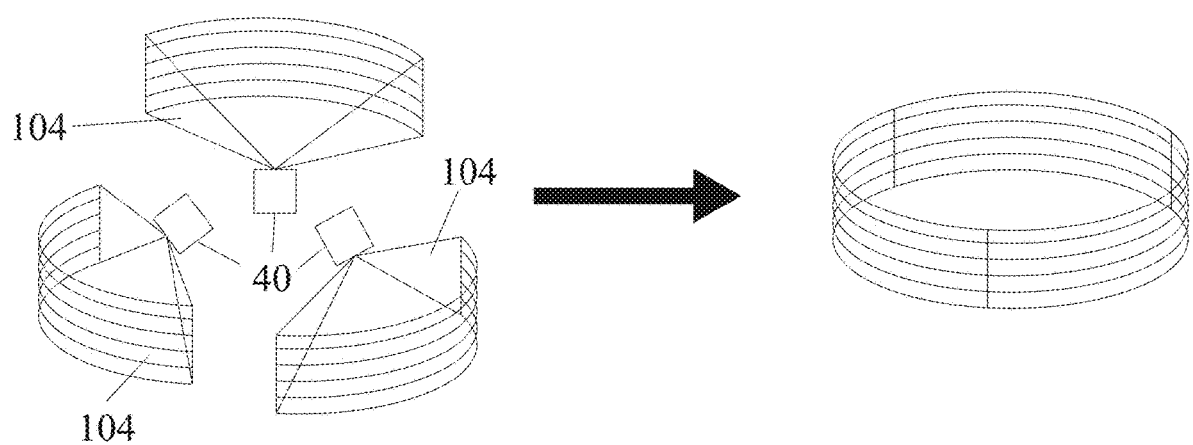
FIG. 7 is a schematic diagram of splicing a plurality of scanning regions of the lidar in FIG. 1.

Referring to FIG. 7, because detection laser emitted by each laser emitting and receiving system 40 forms a scanning region 104 with a specific horizontal angle through the rotation of the rotating polygon mirror 10, that is, the scanning region 104 formed by the two-dimensional scanning light 103, where three laser emitting and receiving systems 40 are used as an example, when the rotating polygon mirror 10 and the wedge prism 30 rotate in a same direction at a preset speed ratio, three scanning regions 104 with horizontal angles of 120° may be formed by controlling emitting of the laser emitting and receiving systems 40, and after the three 120° scanning regions 104 are spliced, horizontal 360° scanning is finally implemented.

In the present disclosure, the vertical field of view $FOV_V$ of the lidar is determined by an angle between the detection laser emitted by the plurality of laser emitting units, a shift angle formed by the detection laser passing through the wedge prism 30, and a rotation angle formed by the detection laser passing through a rotation wedge prism 30. For example, the laser emitting and receiving system include eight laser emitting units. When the eight laser emitting units emit laser beams with angles of 5°, a total angle formed in the vertical direction is 35°. It is set that the laser beams are reflected by the reflecting mirrors 20 to the reflecting surfaces 101 of the rotating polygon mirror 10 after being deflected and rotated by the wedge prism 30, to generate a deflection of 5° in the vertical direction, the original total angle 35° is combined, and a finally formed vertical field of view $FOV_V$ is 40°.

Further, in the lidar provided in the present disclosure, a number of scanning lines in the vertical direction is determined by a number N of laser emitting units, a rotation speed ratio P of the rotation speed of the rotating polygon mirror 10 to the rotation speed of the wedge prism 30, and a number M of reflecting surfaces of the rotating polygon mirror 10, that is, the number of scanning lines=N*P*M. Similarly, for example, the laser emitting and receiving system includes eight laser emitting units. The eight laser emitting units emit eight detection laser at different angles upward along a vertical plane. When the rotation speed ratio of the rotation speed of the rotating polygon mirror 10 to the rotation speed of the wedge prism 30 is 6, and a number of rotating mirror surfaces of the rotating polygon mirror 10 is 4, 8*6*4=192 two-dimensional scanning lines are finally formed.

Figure 8A:
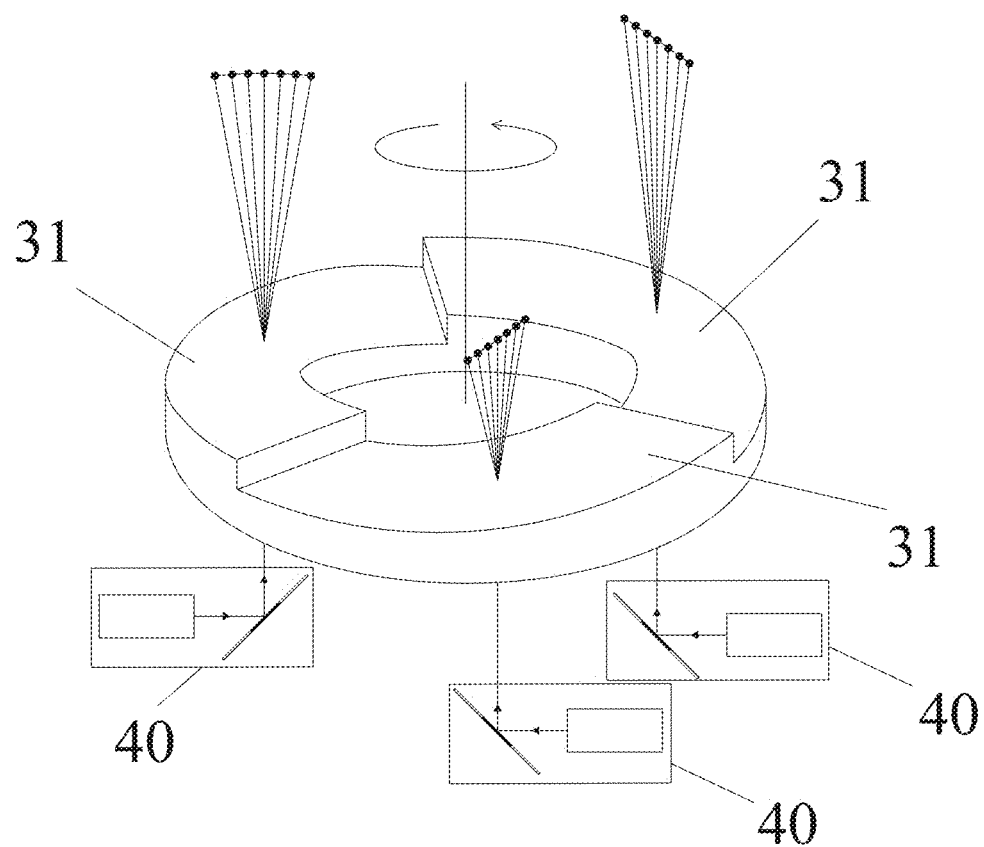
FIG. 8A and FIG. 8B are schematic structural diagrams in which a plurality of wedge prisms in FIG. 1 form a wedge prism group.
Figure 8B:
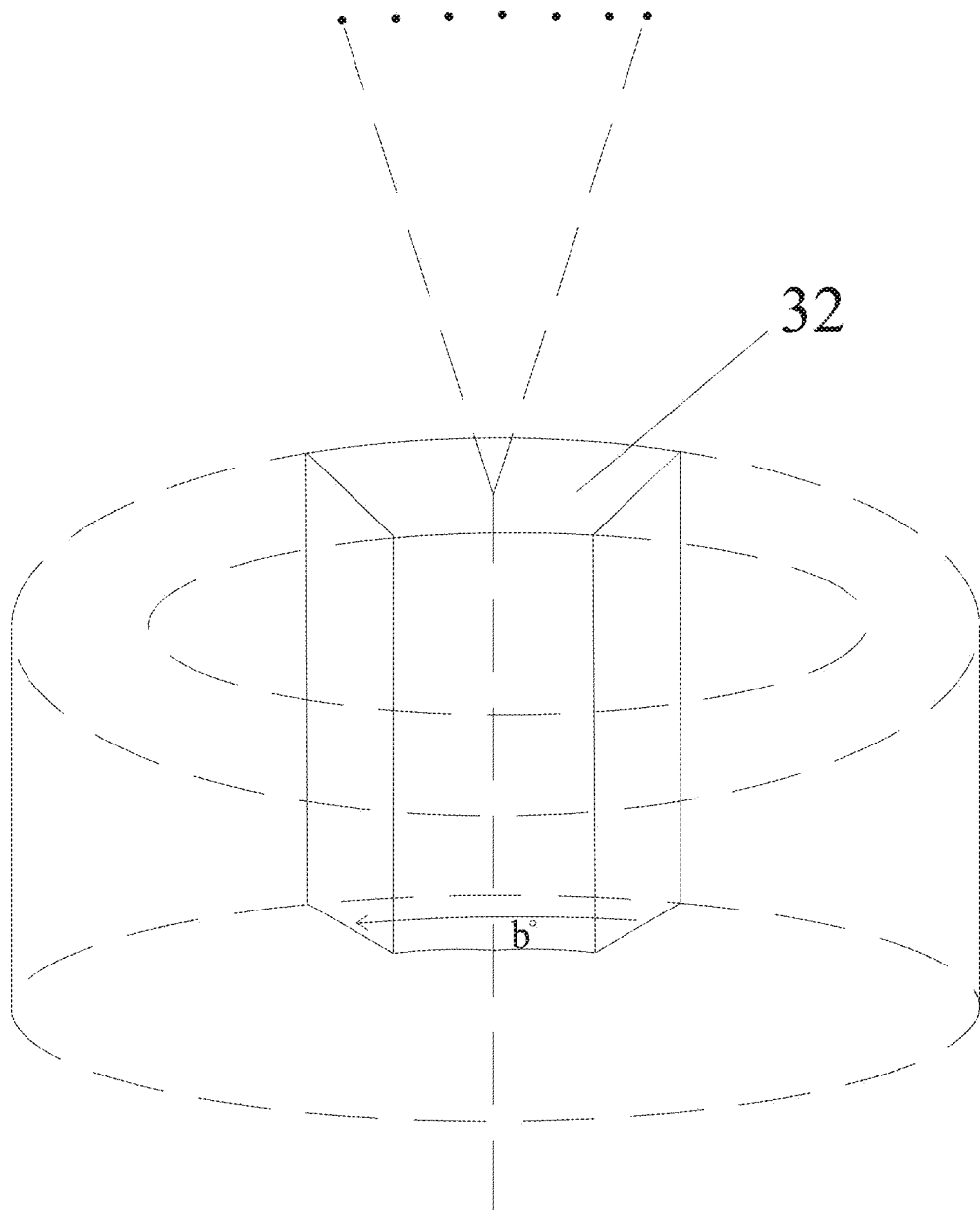

In a preferred embodiment, a plurality of the wedge prism 30 are provided to form a wedge prism group. The wedge prism group includes a plurality of wedge prisms 31. The plurality of wedge prisms 31 are arranged according to a preset rule. An emitting direction of the detection laser can be adjusted more accurately through the wedge prism group, for example, the preset rule may be that the plurality of wedge prisms are arranged and combined to form a prism with an annular cross section. As shown in FIG. 8A, the wedge prism group includes three wedge prisms 31 with a same structure. The three wedge prisms 31 are sequentially combined. In another preferred embodiment, as shown in FIG. 8B, the wedge prism group may include a plurality of wedge prisms 32 with different structures. For example, an angle between the wedge prism 32 and a central axis as a center of the wedge prism group is set to b°. It is assumed that b° is 120°, the wedge prism group includes three wedge prisms 32. If b° is 90°, the wedge prism group includes four wedge prisms 32. Inclined surfaces of the plurality of wedge prisms 32 are successively reduced, and when the plurality of wedge prisms 32 are sequentially combined, the formed wedge prism group may be considered as a wedge prism having an annular inclined surface. It should be noted that the structures of the wedge prism group shown in FIG. 8A and FIG. 8B are only an example for description. A number, shapes, and an arrangement rule of wedge prisms in the wedge prism group may be flexibly set according to an actual situation, which are not excessively limited herein.

Figure 9:
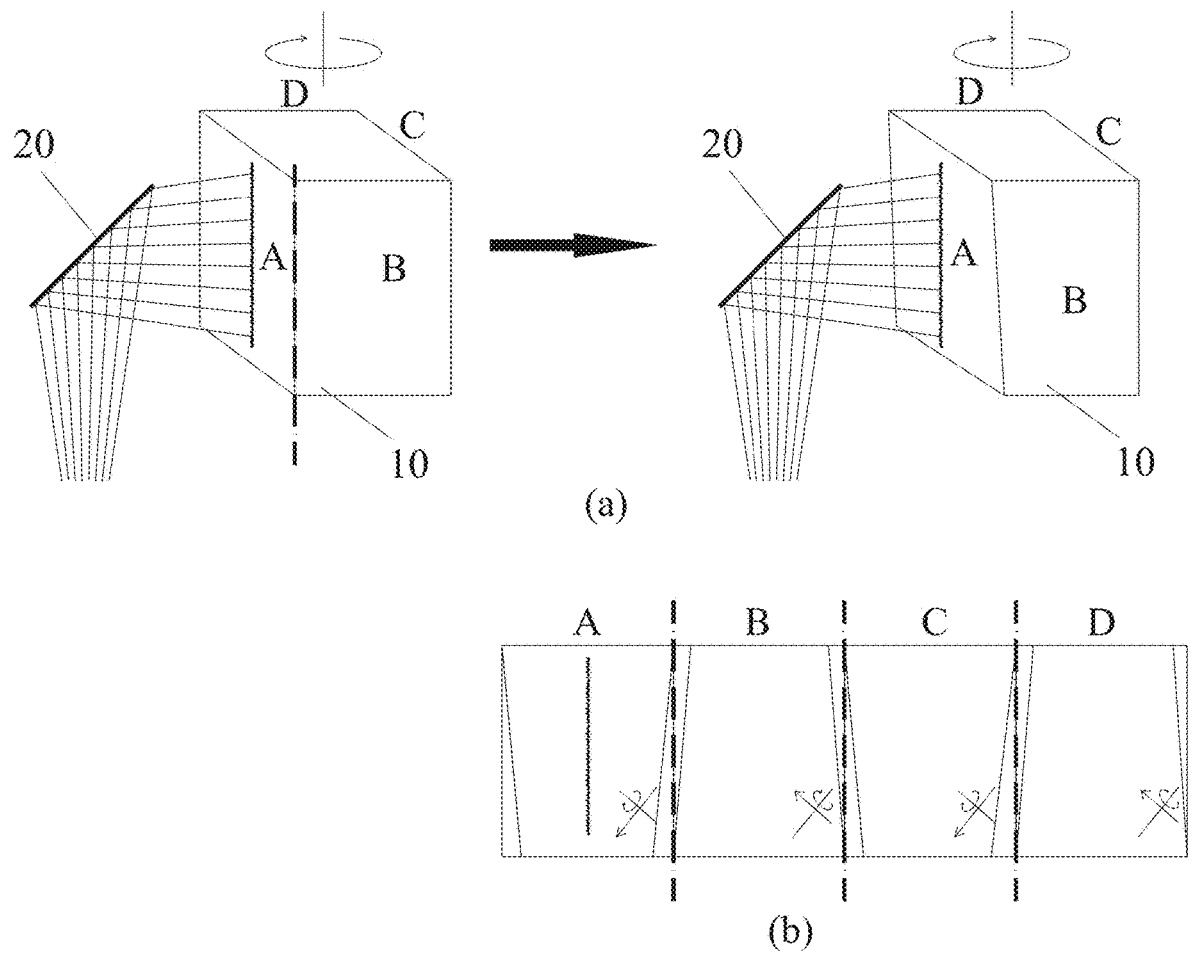
FIG. 9 is a schematic structural diagram of a rotating polygon mirror after a reflecting surface of a rotating polygon mirror in FIG. 1 is inclined.

In addition, in another preferred embodiment, the reflecting surface 101 of the rotating polygon mirror 10 may alternatively be set to form a preset angle with a horizontal plane. Referring to a part (a) in FIG. 9, it is assumed that the surface A of the rotating polygon mirror 10 is inclined downward from being perpendicular to the horizontal plane, an angle between the surface A and the horizontal plane is changed from a right angle to an acute angle. It is assumed that an inclined angle is 2°, the angle between the surface A and the horizontal plane is 88°. The surface B adjacent to the surface A is inclined upward, that is, an angle between the surface B and the horizontal plane is changed from a right angle to an obtuse angle. It is assumed that an inclined angle is 2°, the angle between the surface B and the horizontal plane is 92°. Similarly, the surface C is inclined according to the inclined direction and the inclined angle of the surface A parallel to the surface C, and an angle between the surface C and the horizontal plane is 88°. The surface D is inclined according to the inclined direction and the inclined angle of the surface B parallel to the surface D, and an angle between the surface D and the horizontal plane is 92°. The four reflecting surfaces of the rotating polygon mirror 10 are inclined in different directions. Therefore, the two-dimensional scanning light 103 formed through reflection of the reflecting surfaces 101 is also inclined upward or downward according to different inclined directions of the reflecting surfaces 101. Referring to a part (b) in FIG. 9, with the rotation of the rotating polygon mirror 10, arrows on the reflecting surfaces 101 represent inclined directions of the two-dimensional scanning light 103 formed by the corresponding reflecting surfaces 101.

Figure 10:
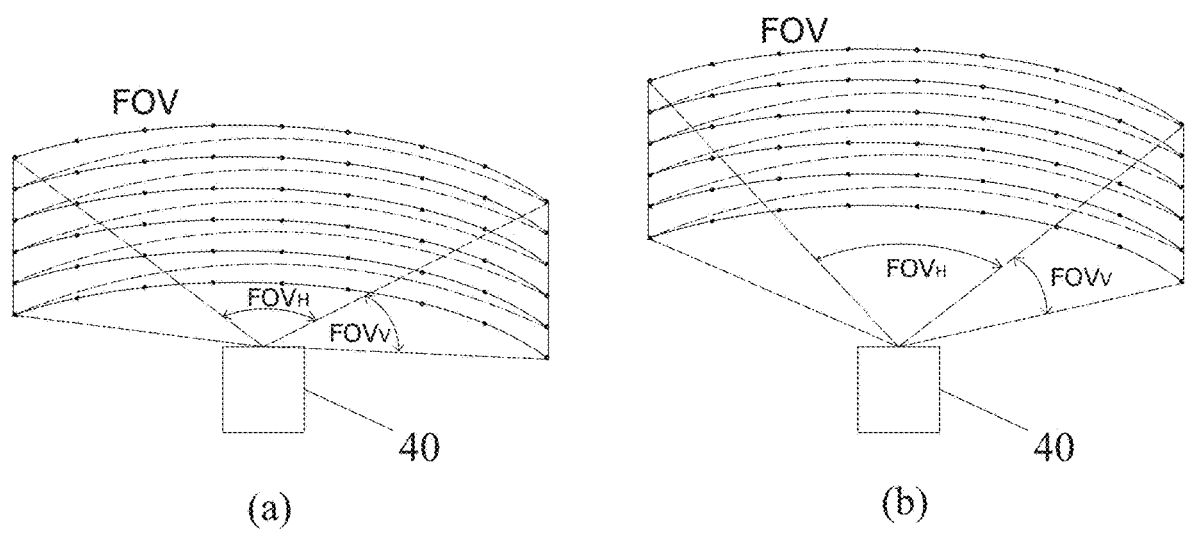
FIG. 10 is a schematic diagram of angular ranges of vertical field of views of two-dimensional scanning light of two adjacent reflecting surfaces in FIG. 9.

When all the reflecting surfaces 101 of the rotating polygon mirror 10 are perpendicular to the horizontal plane, an angle formed between the two-dimensional scanning light 103 generated by each surface and the horizontal plane is the same. When the two-dimensional scanning light 103 corresponding to the four surfaces are combined, it may be considered that the two-dimensional scanning light 103 of the four surfaces is coincident. For example, the vertical field of view $FOV_V$ is 40° in the foregoing embodiment. In this case, an angle of the two-dimensional scanning light 103 in the vertical direction is [−20°, +20°]. After the reflecting surface 101 is inclined, the inclined angle and the inclined direction are used as an example, as shown in a part (a) in FIG. 10, the two-dimensional scanning light 103 generated by the surface A of the rotating polygon mirror 10 is inclined downward, that is, an angular range of the vertical field of view $FOV_V$ is [−22°, +18°]. As shown in a part (b) in FIG. 10, because the surface B is inclined downward, an angular range of the vertical field of view $FOV_V$ of the generated two-dimensional scanning light 103 is [−18°, +22°]. Similarly, angles generated by the surface C and the surface D are respectively the same as the angles generated by the surface A and the surface B.

Figure 11:
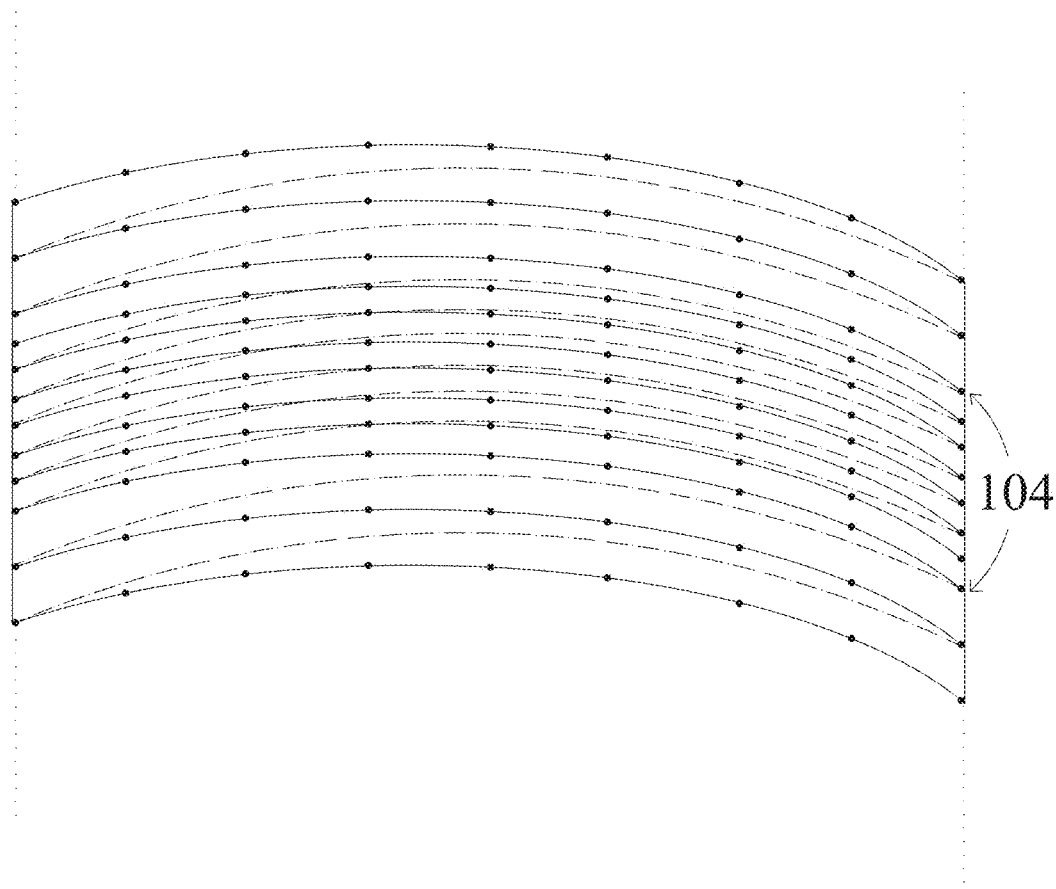
FIG. 11 is a schematic diagram of a trajectory of a dense region of two-dimensional scanning light of the lidar in FIG. 9.

Referring to FIG. 11, when the two-dimensional scanning light 103 corresponding to the four surfaces is combined, an angular range of the combined two-dimensional scanning light 103 in the vertical direction is changed into [−22°, +22°], that is, the vertical field of view $FOV_V$ is 44°. The angular range [−20°, +20°] in the vertical direction obviously means superimposition of scanning point cloud trajectories formed by two adjacent surfaces, that is, a 40° dense region 104 in the vertical direction is formed. That is, the reflecting surface 101 of the rotating polygon mirror 10 is inclined, the vertical field of view $FOV_V$ of the two-dimensional scanning light 103 may be enlarged, and a densely-scanned dense region 104 may be generated, thereby further improving a scanning range and scanning efficiency of the lidar.

According to the hybrid solid-state lidar provided in the present disclosure, the components such as the laser emitting and receiving system are fixed, to avoid a risk of optical path system failure caused by rotating misalignment and falling off of a emitting and receiving component and an optical lens of the mechanical lidar. In addition, all the circuits are fixed on the mechanical structure and do not rotate, which enhances heat dissipation and stability of the lidar and improves the service life of the product. In the lidar provided in the present disclosure, two-dimensional scanning with higher performance than that implemented by the conventional lidar can be implemented by using fewer laser emitting and receiving systems, which not only reduces complexity of a circuit system and a control system, but also reduces the product costs and assembly difficulty, thereby improving production efficiency.

Figure 12:
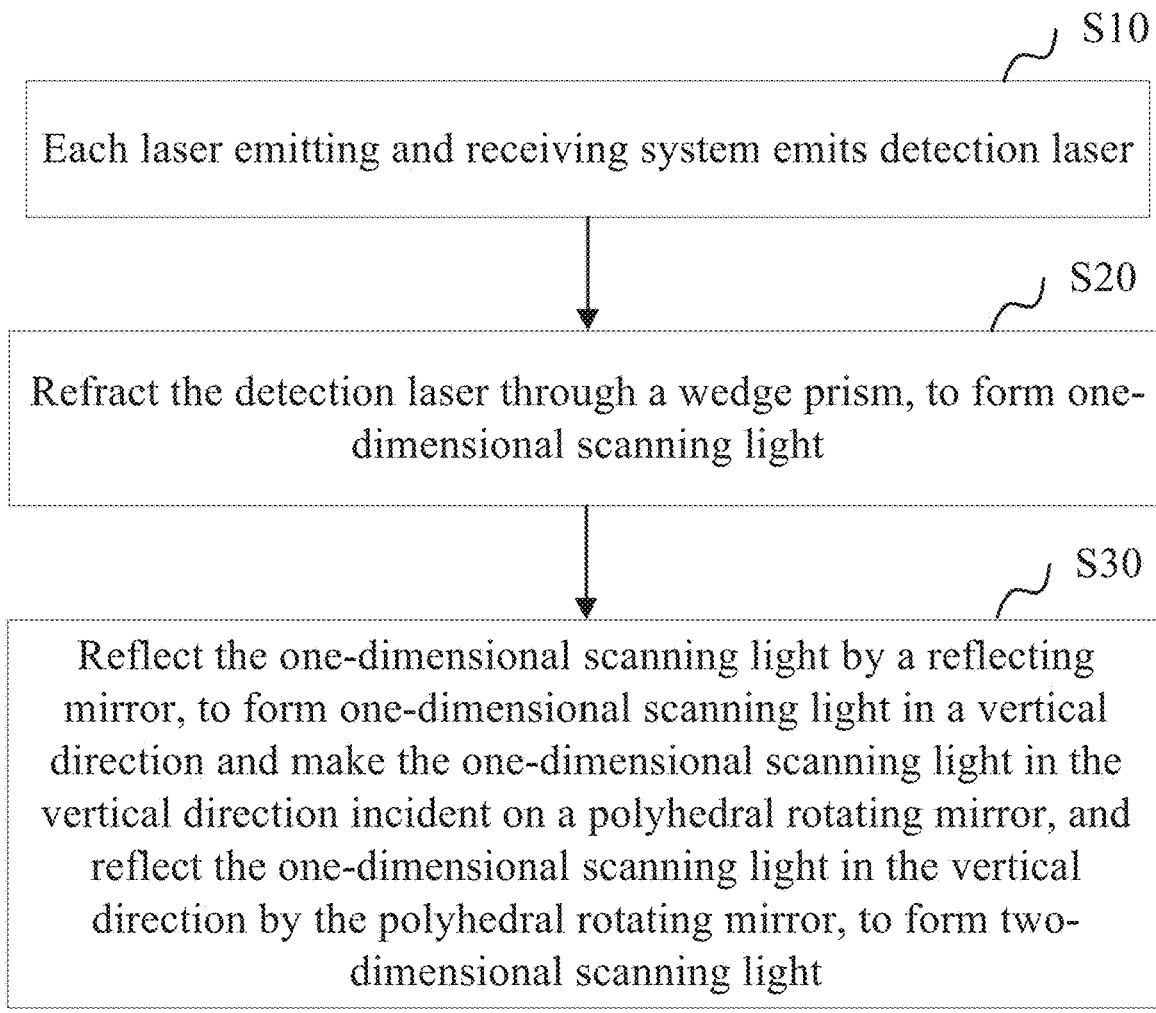
FIG. 12 is a schematic flowchart of a hybrid solid-state lidar scanning method according to an embodiment of the present disclosure.

Referring to FIG. 12, based on a same inventive concept, a second embodiment of the present disclosure provides a hybrid solid-state lidar scanning method, including steps S10 to S30.

Step S10. Each laser emitting and receiving system emits detection laser.

Step S20. Refract the detection laser by a wedge prism, to form one-dimensional scanning light.

Step S30. Reflect the one-dimensional scanning light by a reflecting mirror, to form one-dimensional scanning light in a vertical direction and make the one-dimensional scanning light in the vertical direction incident on a rotating polygon mirror, and reflect the one-dimensional scanning light in the vertical direction by the rotating polygon mirror, to form two-dimensional scanning light.

Further, the step of refracting the detection laser by a wedge prism, to form one-dimensional scanning light includes:

rotating the wedge prism at a preset speed in a preset direction, whereby the detection laser is refracted through the wedge prism to form annular scanning light.

Further, the step of reflecting the one-dimensional scanning light in the vertical direction by the rotating polygon mirror, to form two-dimensional scanning light includes:

reflecting the one-dimensional scanning light in the vertical direction emitted by each laser emitting and receiving system by the rotating polygon mirror to form a plurality of scanning regions having preset horizontal angles, where the preset horizontal angle is an angle obtained by dividing 360° by a number of the laser emitting and receiving systems; and splicing the scanning regions to form two-dimensional scanning with a 360° scanning region.

Based on the foregoing, the embodiments of the present disclosure provide a hybrid solid-state lidar and a scanning method thereof. The hybrid solid-state lidar includes a rotating polygon mirror, a plurality of reflecting mirrors, a wedge prism, and a plurality of laser emitting and receiving systems. The plurality of laser emitting and receiving systems have projections distributed on a same circumference on a horizontal plane and are arranged under the wedge prism in a way that the circumference is circumferentially equally divided by the projections, to allow the wedge prism to refract detection laser emitted by the laser emitting and receiving systems to form one-dimensional scanning light; and the reflecting mirror is disposed above the wedge prism and at a position corresponding to the laser emitting and receiving system, and the rotating polygon mirror is disposed at a center axis position above the wedge prism, whereby the reflecting mirror reflects the one-dimensional scanning light to form one-dimensional scanning light in a vertical direction and make the one-dimensional scanning light in the vertical direction incident on the rotating polygon mirror, and the rotating polygon mirror reflects the one-dimensional scanning light in the vertical direction, to form two-dimensional scanning light. According to the hybrid solid-state laser provided in the present disclosure, the components such as the laser emitting and receiving system are fixed, to avoid stability and service life risks caused by rotation of components in the lidar, and effectively improve the stability and the service life of the lidar, and two-dimensional scanning with higher performance than the conventional lidar is implemented by using a reduced number of laser emitting and receiving systems. In addition, a reduced number of components can effectively reduce the power consumption and the heat generated by the lidar, thereby improving the stability of the lidar.

The embodiments in this specification are described in a progressive manner. For same or similar parts between embodiments, reference may be made to each other. Each embodiment focuses on a difference from other embodiments. For a system embodiment, since it is basically similar to the method embodiment, the description is relatively simple, and reference can be made to the description of the method embodiment. It should be noted that the technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

Only several preferred implementations of the present disclosure are described in detail in the above embodiments, but they should not therefore be construed as limiting the patent scope of the present disclosure. It should be noted that several improvements and replacements may further be made by those of ordinary skill in the art without departing from the technical principle of the present disclosure, and such improvements and replacements should also be deemed as falling within the protection scope of the present disclosure. Therefore, the protection scope of the present disclosure should be subject to the protection scope of the claims.

The invention claimed is:

1. A hybrid solid-state lidar, comprising:
a rotating polygon mirror, a plurality of reflecting mirrors, a wedge prism, and a plurality of laser emitting and receiving systems, wherein
the plurality of laser emitting and receiving systems have projections distributed on a same circumference on a horizontal plane and are arranged under the wedge prism in a way that the circumference is circumferentially equally divided by the projections, to allow the wedge prism to refract detection laser emitted by each of the plurality of laser emitting and receiving systems to form one-dimensional scanning light; and
each of the plurality of reflecting mirrors is disposed above the wedge prism and at a position corresponding to one of the plurality of laser emitting and receiving systems, and the rotating polygon mirror is disposed at a central axis position above the wedge prism, whereby each of the plurality of reflecting mirrors reflects the one-dimensional scanning light to form one-dimensional scanning light in a vertical direction and make the one-dimensional scanning light in the vertical direction incident on the rotating polygon mirror, and the rotating polygon mirror reflects the one-dimensional scanning light in the vertical direction, to form two-dimensional scanning light.

2. The hybrid solid-state lidar according to claim 1, wherein the rotating polygon mirror and the wedge prism rotate in a same direction at a preset speed ratio.

3. The hybrid solid-state lidar according to claim 1, wherein reflecting surfaces of the rotating polygon mirror are arranged in a manner of equally dividing a circumscribed circle of a cross section of the rotating polygon mirror.

4. The hybrid solid-state lidar according to claim 1, wherein each of the plurality of laser emitting and receiving systems emits the detection laser upward along a vertical plane.

5. The hybrid solid-state lidar according to claim 1, wherein each of the plurality of laser emitting and receiving systems comprises a plurality of groups of laser emitting units and laser receiving units.

6. The hybrid solid-state lidar according to claim 5, wherein each of the laser emitting units comprises a semiconductor laser, and each of the laser receiving units comprises an avalanche photo diode (APD) and/or a silicon photo multiplier (SIPM) array sensor.

7. The hybrid solid-state lidar according to claim 1, wherein a plurality of the wedge prisms are provided, and the plurality of the wedge prisms are arranged according to a preset rule to form a wedge prism group.

8. A hybrid solid-state lidar scanning method, comprising:
emitting, by each of a plurality of laser emitting and receiving systems, detection laser;
refracting the detection laser by a wedge prism, to form one-dimensional scanning light; and
reflecting the one-dimensional scanning light by a reflecting mirror, to form one-dimensional scanning light in a vertical direction and make the one-dimensional scanning light in the vertical direction incident on a rotating polygon mirror, and reflecting the one-dimensional scanning light in the vertical direction by the rotating polygon mirror, to form two-dimensional scanning light.

9. The hybrid solid-state lidar scanning method according to claim 8, wherein the step of refracting the detection laser by a wedge prism to form one-dimensional scanning light comprises:
rotating the wedge prism at a preset speed in a preset direction, whereby the detection laser is refracted through the wedge prism to form annular scanning light.

10. The hybrid solid-state lidar scanning method according to claim 9, wherein the step of reflecting the one-dimensional scanning light in the vertical direction by the rotating polygon mirror, to form two-dimensional scanning light comprises:
reflecting the one-dimensional scanning light in the vertical direction emitted by each of the plurality of laser emitting and receiving systems by the rotating polygon mirror to form a plurality of scanning regions having preset horizontal angles, wherein the preset horizontal angle is an angle obtained by dividing 360° by a number of the plurality of laser emitting and receiving systems; and
splicing the scanning regions to form two-dimensional scanning with a 360° scanning region.

* * * * *